Figure 1:
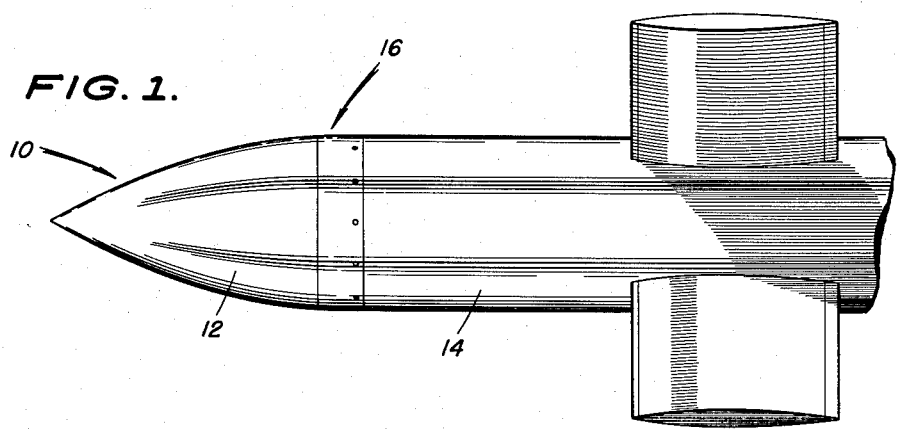

Jan. 7, 1964 A. B. NEPPLE 3,116,547
METHOD FOR COUPLING A PAIR OF CYLINDRICAL
MEMBERS IN END-TO-END ABUTMENT
Original Filed March 8, 1960

ARTHUR B. NEPPLE
INVENTOR.

BY

Claude Funkhouser
ATTORNEY

United States Patent Office 3,116,547
Patented Jan. 7, 1964

3,116,547
METHOD FOR COUPLING A PAIR OF CYLINDRICAL MEMBERS IN END-TO-END ABUTMENT
Arthur B. Nepple, Rockville, Md., assignor to the United States of America as represented by the Secretary of the Navy
Original application Mar. 8, 1960, Ser. No. 13,663, now Patent No. 3,103,887, dated Sept. 17, 1963. Divided and this application Mar. 2, 1962, Ser. No. 184,622
2 Claims. (Cl. 29—460)

The present invention relates to an attaching and coupling means and more particularly to a method of securing a relatively thin shelled member to a second member. This application is a division of copending U.S. patent application Serial No. 13,663, filed March 8, 1960, now Patent Number 3,103,887, by the same inventor.

Attaching problems arise whenever relatively thin walled members are to be joined to another member, especially when the first member is of brittle material and the structural loads encountered are of considerable magnitude. Such conditions are present in certain missile designs where ceramic material is used in airframe primary structures because of the favorable characteristics of such materials in a high temperature environment. It is apparent that this use of ceramic material will create a special requirement for satisfactory ceramic-to-metal and ceramic-to-ceramic attachments. Because of the relatively low tensile strength of ceramics as compared to steel, and because of its complete lack of ductility, it is not feasible to utilize conventional attaching methods. The attachment must not only withstand the structural loads over wide temperature ranges, but also must perform satisfactorily through high heating rates, since under these conditions, the thermal stresses resulting from differential expansion and temperature gradients will add to the ordinary structural loads. The satisfactory attachment must also maintain the assembly in coupled relationship with a high degree of stiffness. In missiles having a high fineness ratio, that is, a high length to diameter ratio, it is extremely desirable to maintain overall stiffness in order that the natural frequency of the missile structure be high. Structural advantages as well as operational advantages accrue from a high natural frequency in a missile structure. Other obvious requirements of a satisfactory attachment are low weight, small cross-section, fabrication cost and ease of assembly.

It is therefore the principal object of the present invention to provide a suitable attachment method for coupling a thin-shelled brittle member such as a missile radome to a second member such as a missile body. The present invention will not only provide a satisfactory coupling from a structural standpoint with high strength, low weight and cross-section, but will also provide advantageous features such as elimination of certain inherent electrical problems, avoidance of use of critical materials, and ease and low cost of fabrication. While the present invention is herein described in connection with a ceramic radome and a metal missile body, it will readily be seen that it is applicable as an attachment device for ceramic-to-ceramic or metal-to-metal connections.

Briefly, the present invention comprises a ring of glass fibers or other high strength filament wrapped under tension and cured onto one of the members to be joined in such manner as to produce a residual stress in the ring. The resulting assembly of the ring and member is then secured to the other member by a plurality of mechanical fasteners. Presence of the residual stress in the ring provides a strong combination bonded-mechanical joint which will withstand high stresses of differential thermal expansions as well as of severe structural loads. In a ceramic radome and metallic missile body application, the ceramic radome is encircled by the glass fiber ring to produce a combination bonded-mechanical joint, shear fasteners being provided to secure the ring to the missile body.

Figure 2:
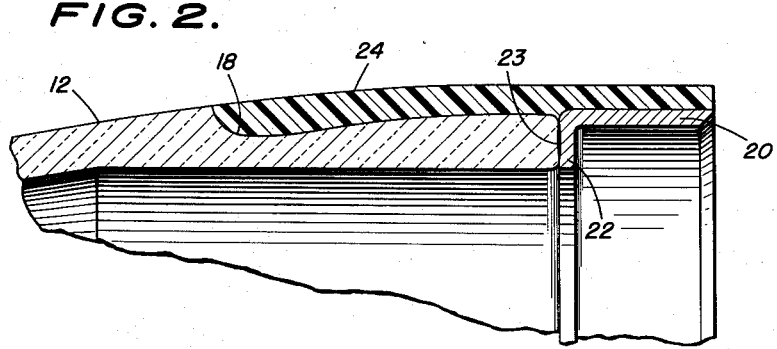

Other objects and many of the attendant advantages of this invention will be readily appreciated as the same becomes better understood by reference to the following detailed description when considered in connection with the accompanying drawings in which:

FIG. 1 is an elevation showing the missile radome coupled to a missile body by the present invention;
FIG. 2 is an enlarged fragmentary section showing the glass fiber ring wrapped onto the ceramic radome; and
FIG. 3 is an enlarged fragmentary section showing the attaching details.

Referring now to the drawing in detail, FIG. 1 shows a missile 10 having a ceramic radome 12 coupled to a missile body 14 by an attachment 16 constituting the present invention.

In FIG. 2 it can be seen that the radome 12 is provided on the outer periphery thereof with a groove 18 near the aft end of the radome, the forward portion of the groove being somewhat deeper than the rearward portion. Positioned at the aft end of the radome 12 is a circular band 20 having an inwardly depending flange 22 which abuts the radome and is cemented thereto. Girdling the radome 12 and band 20 is a glass fiber ring 24 that is wrapped under tension and cured thereon so as to provide a residual compressive stress in the ceramic radome.

Figure 3:
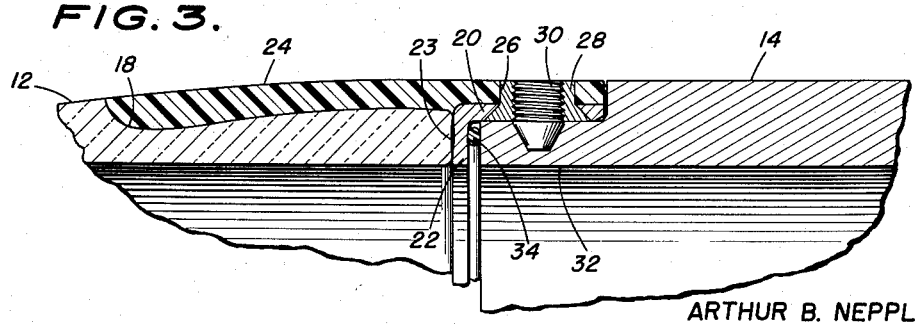

In FIG. 3 it can be seen that a plurality of apertures 26 are formed around the periphery of the band 20 and extend through the ring 24, the apertures being countersunk on the inner face of the band. Pressed into the apertures 26 are inserts 28 which accommodate screws 30 for engagement with a forwardly extending flange 32 on the missile body 14. Interposed between the end of the flange 32 and the flange 22 is a seal 34.

It is seen then that the glass fiber ring 24 is first bonded to the ceramic radome 12 and then mechanically fastened to the missile body 14 to securely attach the radome to the missile body. Because the ring 24 is formed with glass fibers wrapped under tension, a residual hoop tension stress is produced therein which is maintained after curing. This tension in the glass fiber ring coupled with the fact that the groove 18 is formed with a reverse taper provides a combination bonded-mechanical joint and solves the problem of differential expansions since any thermal stress induced will be opposed by the residual stress in the ring. While this pre-stress in tension in the ring, with accompanying compressive pre-stress in the radome, prevents the ring from loosening from the radome due to any temperature rise of the joint under high speed flight conditions, excessive pre-stress is undesirable since it results in excessive stresses in the radome. Also, excessive pressures within the glass fiber ring could tend to force resin out.

The incorporation of the band 20, which is preferably made of steel, tends to maintain a better sealing surface and also tends to hold the internal tolerance on surface mating to the missile body. More important, however, is the fact that the band 20 also provides a high modulus and strength to resist compression fastener loads, and to retain tension pre-stress in the aft portion of the glass fiber ring 24 to resist compression fastener loads.

The tension wrapping of the radome 12 is best done by mounting it and the band 20 in juxtaposition on a mandrel, a cement being applied to the abutting surfaces of the end of the radome and the flange 22 of the band 20. The surface of the radome and band to receive the glass fiber wrapping is wetted with an adhesive such as Epon VIII. Glass fibers in the form of tape such as Type XP150 or XP126 produced by the Minnesota Mining and Manufacturing Co., is then wrapped onto the radome and band under tension of the order of 125–300 pounds depending on the amount of pre-stressing desired. After one layer of the tape is wound tangentially onto the radome and band, the mandrel is stopped and, with the tension maintained on the tape, a layer of glass fibers with the fibers running axially is placed over the first layer. Adherence of the axial fiber layer to the first layer is obtained by heating and softening the resin with a warm air dryer. Alternate layers of trangentially wound tape and axial fibers are then installed onto the radome and band until the desired thickness is obtained. Four or five of these alternate layers have been found to produce excellent results; however, it has been discovered that superior results have been obtained by over-wrapping, that is, by wrapping a considerable excess of glass fiber material onto the radome and band, and then machining to the desired diameter. By this method, greater hoop loading stresses in the ring have been attained.

The last layer of tangential tape may be sealed just before releasing the tension by applying heat from a soldering iron. After the wrapping is completed, the radome, band and glass fiber ring are cured in an oven for about six or seven hours at approximately 300° F. Machining of the excess glass fiber material is best accomplished after the curing step, and as previously mentioned, residual stresses remain in the ring and radome after curing and machining.

Obviously many modifications and variations of the present invention are possible in the light of the above teachings. It is therefore to be understood that within the scope of the appended claims the invention may be practiced otherwise than as specifically described.

What is claimed is:

1. The method of attaching a ceramic radome to a metallic missile body, comprising the steps of grinding a peripheral groove in the outer wall of the radome near the rear face thereof, positioning an annular band in abutment with the rear face of said radome, wrapping a ring comprising alternate layers of tangential and axial glass fibers onto said radome at said groove and onto said band until an excess of glass fiber material has been built up, said tangential fibers being applied under a tension force, curing the resulting assembly of said glass fiber ring, radome and band, machining off the excess glass fiber material from said ring, and attaching said glass fiber ring and band by screw fasteners to said missile body.

2. A method for coupling a pair of cylindrical members in end-to-end abutment, comprising the steps of forming a peripheral groove in the outer wall of one of said members near the abutting end thereof, positioning an annular band in juxtaposition with the abutting end of said one member, wrapping a ring comprising alternate layers of tangential and axial glass fibers onto said one member at said groove and onto said band until an excess of said glass fiber material has been built up, said tangential fibers being applied under a sufficient tension force so as to produce a residual tension stress in said ring, curing the resulting assembly of said one member, band and glass fiber ring, machining off the excess glass fiber material from said ring, and attaching said glass fiber ring and band to the other of said pair of members by screw fasteners.

References Cited in the file of this patent

UNITED STATES PATENTS

| | | |
|---|---|---|
| 2,426,384 | Blanchard | Aug. 26, 1947 |
| 2,522,277 | Knowland et al. | Sept. 12, 1950 |
| 2,837,456 | Parilla | June 3, 1958 |
| 2,872,865 | Skaar | Feb. 10, 1959 |
| 2,876,011 | Hunt | Mar. 3, 1959 |
| 3,023,135 | Wiltshire | Feb. 27, 1962 |